Jan. 28, 1930.  R. W. MACKIE  1,744,778
COLLAR SUPPORT
Filed Dec. 21, 1928

INVENTOR
RICHARD W. MACKIE

Patented Jan. 28, 1930

1,744,778

UNITED STATES PATENT OFFICE

RICHARD W. MACKIE, OF WINTHROP, MASSACHUSETTS

COLLAR SUPPORT

Application filed December 21, 1928. Serial No. 327,689.

The present invention relates to form retaining devices or supports particularly adapted for use with soft collars or the like.

Soft collars have a tendency to lose their shape and become wrinkled especially during warm weather. Various pins and joining bars have been in use for holding the two collar points in place, however, this method results in a pinched-in effect, or a pulling of the collar points together at the point of attachment of the pin or bar, causing the collar to assume various unattractive positions and angles.

The objects of my invention are to construct a simple collar support which is cheap to manufacture, easy to fit in any size collar and which will when inserted hold the points of the collar in shape and at the proper distance apart and overcome the present aforementioned objections.

Referring to the accompanying drawing.

Figure 1:
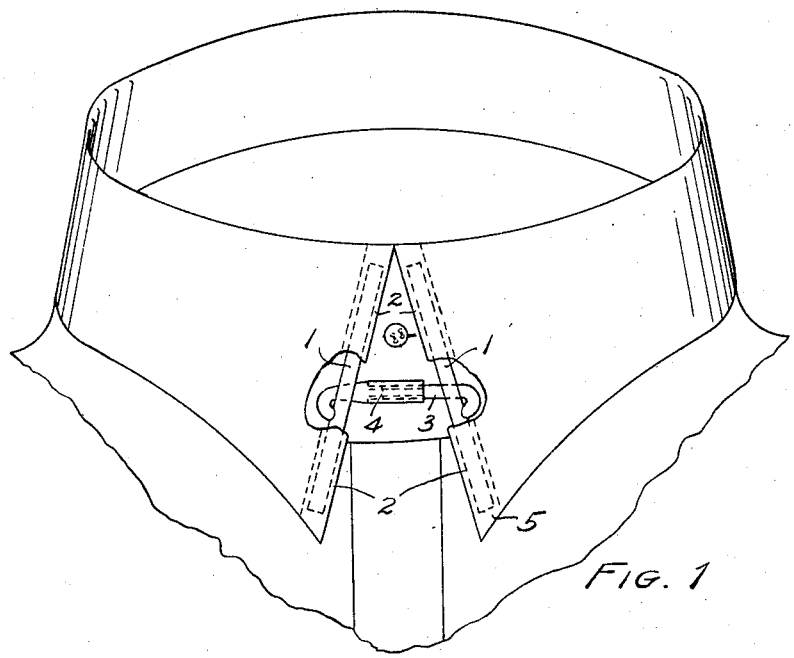
Figure 1 is a view showing the collar support on a collar.
Figure 2:
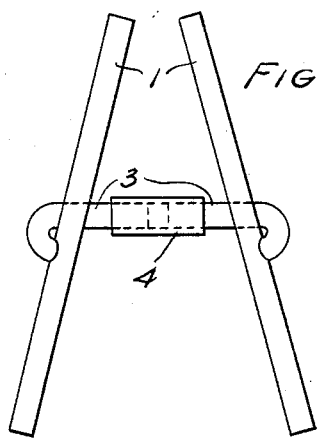
Fig. 2 is a plan view of a modified form of the support.
Figure 4:
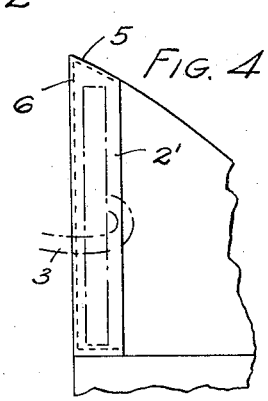
Fig. 4 illustrates a form of pocket with which the support stays cooperate.
Figure 3:
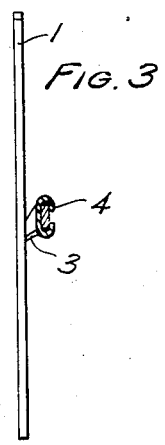
Fig. 3 is a side view partly in section of the support shown in Fig. 1.

Flat stays 1 of metal or fibre are provided for insertion in pockets or slots 2 provided beneath the edges of the collar points 5. The pockets 2 of the collar with which the supporting stays 1 cooperate are sewn or otherwise attached on the under side of the edges of the collar points 5 and extend substantially from the top to the bottom edges of the fold over section of the collar. The ends and one side of the pocket are closed but the side away from the collar tips is open to permit the insertion of the form retainer. At substantially the midpoint of each flexible or rigid stay 1 there is secured at an angle sufficient to keep the collar separated at the desired distance lateraly extending arms or joining bars 3. At the points of connection to the stays the joining bars may project inwardly, making a U-shaped curve slightly separating the joining bars and the strips permitting the easy insertion of the strips in the pockets of the collar. The two joining bars or laterally extending arms 3 are held together by the adjustable friction coupling 4. The joining bars may be either flat or round.

The coupling frictionally engages the joining bars and permits their easy displacement and holds the bars in any desired position. If the joining bars are flat the coupling is made from a metal piece slightly wider than the joining bars and folded over along its sides so as to provide a slot to hold the joining bars. The coupling may then be squeezed and the joining bars inserted in the coupling under a slight pressure, thereafter retaining their position until forcibly withdrawn.

In Fig. 1 the coupling is shown as being integral with the arm of one supporting stay, the device comprising only two members, one of the lateral arms being a male and the other a female member. One of the laterally extending arms 3 slides into the other laterally extending arm and is frictionally held in any desired position. The frictional engaging means of the female member may be formed by crimping its edges as in the separate coupling member. In the preferred form the male and female members are flat in cross section, however, it is obvious that they may be circular, the male member being larger in cross section than the female member so that it will frictionally engage the female member and hold the supporting stays in any desired position.

The different parts may be made of metal to permit their bending in any desired position.

While I have illustrated and described a particular embodiment of my invention, I do not wish it to be understood as intending it to be limited thereto, as the same may be variously modified and altered without departing from the spirit and scope of my invention.

What I claim as new and desire to secure by Letters Patent is:—

1. The combination with a collar having a pocket disposed on the inner side of each collar point, of a collar support comprising a pair of flexible downwardly diverging stays adapted to be inserted in said pockets, a member fixed to and extending from the outer edge of each of said stays at substantially their midpoint making a U-shaped bend backward and projecting inwardly toward each other forming laterally extending arms, and frictional means for adjustably coupling said arms.

2. In combination with a collar having pockets disposed on the under side of the fold over section adjacent the inner edge of the collar ends and having the open side of the pocket away from the collar ends, a collar support comprising a pair of downwardly diverging stays adapted to be inserted in said pockets, laterally extending arms fixed to each stay member, one of said laterally extending arms having its lateral edges bent over forming a slotted receptacle adapted to receive and frictionally engage said other laterally extending arm.

In testimony whereof I affix my signature.

RICHARD W. MACKIE.